(12) United States Patent
Smith

(10) Patent No.: US 6,189,926 B1
(45) Date of Patent: Feb. 20, 2001

(54) AIRBAG INFLATOR WITH CENTER DISCHARGE AND SOFT ONSET

(75) Inventor: Bradley W. Smith, Ogden, UT (US)

(73) Assignee: Autoliv ASP, Inc., Ogden, UT (US)

( * ) Notice: Under 35 U.S.C. 154(b), the term of this patent shall be extended for 0 days.

(21) Appl. No.: 08/991,073

(22) Filed: Dec. 16, 1997

(51) Int. Cl.$^7$ ................................................. B60R 21/26
(52) U.S. Cl. ........................................... 280/737; 280/741
(58) Field of Search .................................. 280/737, 742, 280/736, 741

(56) References Cited

U.S. PATENT DOCUMENTS

| | | |
|---|---|---|
| 3,689,105 | 9/1972 | Matsui et al. . |
| 3,726,649 | 4/1973 | Pelham . |
| 3,796,441 | 3/1974 | Fohl . |
| 4,512,355 | 4/1985 | Galbraith . |
| 5,031,932 | 7/1991 | Frantom et al. . |
| 5,060,973 | 10/1991 | Giovanetti . |
| 5,078,422 | 1/1992 | Hamilton et al. . |
| 5,290,060 | 3/1994 | Smith . |
| 5,301,979 | 4/1994 | Allard . |
| 5,330,730 | 7/1994 | Brede et al. . |
| 5,344,186 | 9/1994 | Bergerson et al. . |
| 5,348,344 | 9/1994 | Blumenthal et al. . |
| 5,350,192 | 9/1994 | Blumethal . |
| 5,351,988 | 10/1994 | Bishop et al. . |
| 5,356,176 | 10/1994 | Wells . |
| 5,360,232 | 11/1994 | Lowe et al. . |
| 5,364,127 | 11/1994 | Cuevas . |
| 5,400,487 | 3/1995 | Gioutsos et al. . |
| 5,413,378 | 5/1995 | Steffens, Jr. et al. . |
| 5,415,845 * | 5/1995 | Brede et al. ......................... 422/305 |
| 5,439,249 | 8/1995 | Steffens, Jr. et al. . |
| 5,470,104 | 11/1995 | Smith et al. . |
| 5,536,040 | 7/1996 | Cuevas et al. . |
| 5,582,428 * | 12/1996 | Buchanan et al. .................... 280/741 |
| 5,601,309 * | 2/1997 | Bender et al. ....................... 280/737 |
| 5,630,619 * | 5/1997 | Buchanan et al. .................... 280/741 |
| 5,651,563 * | 7/1997 | Cuevas ................................ 280/737 |
| 5,664,802 | 9/1997 | Harris et al. . |
| 5,690,357 | 11/1997 | Cuevas . |
| 5,709,406 * | 1/1998 | Buchanan ............................ 280/737 |

* cited by examiner

Primary Examiner—Peter C. English
Assistant Examiner—Lynda Jasmin

(57) ABSTRACT

An inflator having a combustion chamber and a stored gas chamber separated by a bulkhead. The bulkhead includes a flow passage extending between the combustion chamber and stored gas chamber, with a plurality of exit ports opening onto the flow passage. A flow plug is initially received in the flow passage to block the flow of the stored gas from the stored gas chamber. Activation of the inflator causes increased pressure in the combustion chamber, which forces the flow plug from the flow passage to permit the stored gas to flow through the exit ports, and for the heating gas from the combustion chamber to mix with the stored gas. A head flange may be formed on the flow plug to permit the stored gas to begin exiting the stored gas chamber prior to mixing with the heating gas. A slide nozzle may also be interposed between the flow plug and flow passage to form a nozzle forcing the heating gas to mix with the stored gas prior to exiting the inflator.

16 Claims, 3 Drawing Sheets

AIRBAG INFLATOR WITH CENTER DISCHARGE AND SOFT ONSET

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to inflators used in airbag restraint systems. In particular, the present invention relates to an improved inflator having heated stored gas, with central discharge of the gas and soft onset of cushion inflation.

Airbag restraint systems typically include a controller for determining when a collision occurs, an inflator which receives a signal from the controller to produce a quantity of inflation gas, and a cushion which receives, and is inflated by, the inflation gas. The vehicle occupant compresses the inflated cushion to reduce the collision force and reduce or eliminate injury. Various types of inflators are known, and are generally grouped according to their operating principles.

One preferred inflator type employs a quantity of stored gas and a heater for the gas. It is well known that heating a gas will increase its expanded volume. As such, the heater will heat the stored gas, increasing its expanded volume. This permits a smaller quantity of gas to be stored, reducing the size of the pressure vessel holding the stored gas. Additionally, the heater itself may produce gas (such as during a combustion or reaction) which will combine with the stored gas to inflate the cushion, further reducing the quantity of stored gas required. In addition to increasing the expanded volume, the heater also typically raises the pressure of the stored gas during inflator functioning. This can have a negative effect, in that it increases the structural requirements (and therefore weight) of the pressure vessel. Many inflators of this type rely upon the pressure increase in the stored gas, due to operation of the heater, to rupture a diaphragm, which starts the flow of inflation gas from the inflator. This creates a high initial rate of gas flow into the cushion, which is not desirable for inflation. Specifically, a high initial gas flow can rapidly expand the cushion with considerable force, which may cause injury to an occupant who is out of the normal seating position and in the path of the deploying cushion. It is therefore desirable to provide an inflator which initially releases unheated stored gas (low initial rate of gas flow), followed by heating of the remaining stored gas to still provide for the increased expanded volume benefit of the heater. As such, the delayed operation of the heater may be timed to provide an initially lower gas flow rate, which increases smoothly. This initial low gas flow rate which increases smoothly is often referred to as a "soft onset". As such, these inflators may provide a very advantageous inflation of the cushion.

A further problem associated with these inflators is the flow of the gas influencing the direction in which the cushion deploys during inflation. The cushion must move quickly to the desired position in front of the vehicle occupant in order to provide protection. Many inflators of this type, however, cause the gas to flow into the cushion in a manner which skews deployment, moving the cushion in a direction other than directly toward the vehicle occupant.

This is due to the placement of the gas outlet vents on the end of the inflator. The most common shape for the stored gas container is an elongated tank, similar to tanks for storing oxygen, air, or other compressed gas. To ensure the tank has sufficient strength to withstand the pressure of the stored gas, the outlet is located at one longitudinal end of the tank, again similar to other stored gas tanks. The heater is typically mounted within the tank. While the inflator outlet is located at this one end, the open mouth of the cushion is typically mounted beside the inflator, and extends along the full length of the inflator. This provides a sufficiently large opening to permit rapid inflation of the cushion, while keeping the airbag system to a reasonably small size.

When activated, the gas exits the inflator very rapidly, and enters the mouth of the cushion. The placement of the outlet at one end of the inflator (and thus at one side of the cushion mouth) causes a large flow of gas to impinge upon the inflating cushion along that one side. This large flow often forces the cushion to deploy toward that side. While a diffuser may be placed between the inflator and cushion to assist in a more even distribution of the flowing gas, this problem continues to cause concern.

SUMMARY OF THE INVENTION

An object of the present invention is to provide an inflator which safely and reliably provides inflation gas.

Another object of the present invention is to provide an inflator which heats a stored gas at a delayed time, providing soft onset of pressure within the cushion.

A further object of the present invention is to provide an inflator having gas discharge more centrally located for proper cushion deployment.

These and other objects are achieved by an inflator having a combustion chamber and a stored gas chamber separated by a bulkhead. The bulkhead includes a flow passage extending between the combustion chamber and stored gas chamber, with a plurality of exit ports opening onto the flow passage. A flow plug is initially received in the flow passage to block the flow of the stored gas from the stored gas chamber. Activation of the inflator causes increased pressure in the combustion chamber, which forces the flow plug from the flow passage to permit the stored gas to flow through the exit ports, and for the heating gas from the combustion chamber to mix with the stored gas. A head flange may be formed on the flow plug to permit the stored gas to begin exiting the stored gas chamber prior to mixing with the heating gas. A slide nozzle may also be interposed between the flow plug and flow passage to form a nozzle forcing the heating gas to mix with the stored gas prior to exiting the inflator.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
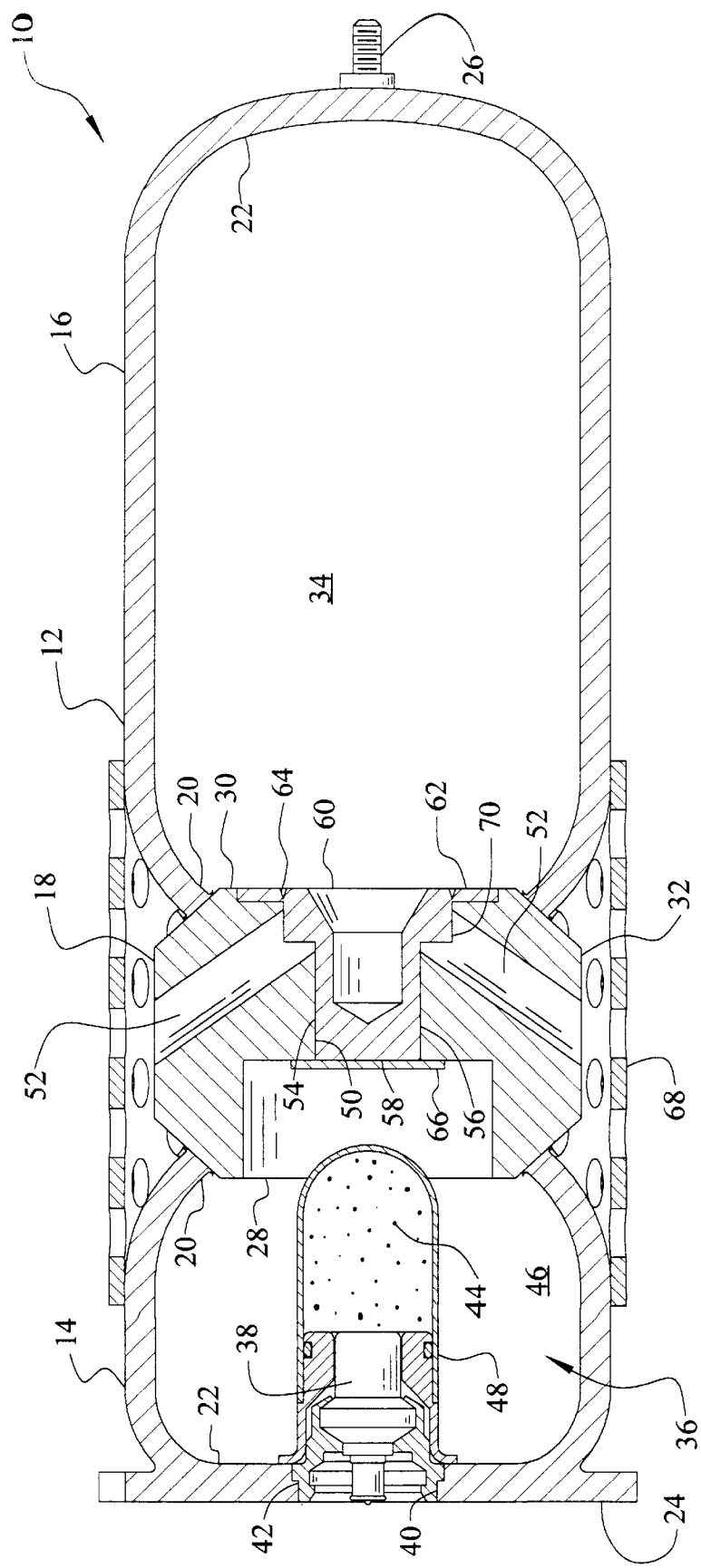
FIG. 1 is a side view, in partial cross-section, of a first embodiment of the present invention prior to activation.

With reference to FIG. 1, an inflator according the first embodiment of the present invention is generally designated by reference numeral 10. The inflator 10 includes a housing 12 defining a combustion chamber 14 and a stored gas chamber 16, separated by a bulkhead 18. The combustion chamber 14 and stored gas chamber 16 may each take the general form of a cylinder commonly associated with the storage of pressurized gases, and will include a first longitudinal end 20 adjacent the bulkhead 18 and a second longitudinal end 22 spaced from the bulkhead 18. The second longitudinal ends 22 may be closed by an appropriate end cap secured to the cylinder, or these ends may be monolithic portions of the chambers 14 and 16, as shown. These ends 22 may also include appropriate elements to secure the inflator 10 to a module housing (not shown). For example, the second longitudinal end 22 of the combustion chamber 14 may include a peripheral flange 24 (possibly with an alignment notch), and the second longitudinal end 22 of the stored gas chamber 16 may include a longitudinally extending mounting bolt 26. Other arrangements are, of course, possible.

The first longitudinal ends 20 of each cylinder are secured to the bulkhead 18, such that the bulkhead 18 serves to close and seal the ends 20. In this regard, the bulkhead 18 takes the general form of a disc, having first and second chamber faces 28 and 30, respectively, and a peripheral sidewall 32 extending therebetween. The first longitudinal end 20 of the combustion chamber 14 is secured to the first chamber face 28, and the first longitudinal end 20 of the stored gas chamber 16 is secured to the second chamber face 30. Each of these connections is preferably effected by welding, and most preferably inertia welding. Further, the first chamber face 28 and second chamber face 30 may include tapered portions adjacent their peripheral edges, as shown, to provide a more suitable surface for this welding operation.

The stored gas chamber 16 and bulkhead 18 thus serve to define an interior which holds a quantity of stored gas 34 under pressure. The stored gas 34 may be an inert gas such as nitrogen or argon, or could be (or include) a reactive gas which contributes to the combustion described more fully below. The stored gas chamber 16 or bulkhead 18 will typically include a fill port (not shown) for introducing the stored gas 34, or the stored gas chamber 16 could be secured to the bulkhead 18 in a pressurized atmosphere of the stored gas 34.

The combustion chamber 14 includes a quantity of heating material 36 and an initiator 38. As is known in the art, the initiator 38 will be connected to (or include) a controller (not shown) which provides a signal when activation of the inflator 10 is desired. This causes the initiator 38 to activate, which in turn causes the heating material 36 to produce a quantity of heating gas. This heating gas will mix with the stored gas 34 to raise the temperature, and thus the pressure of the stored gas 34, as described more fully below.

The initiator 38 may be of any variety known in the art, and compatible with the particular heating material 36 employed. For example, the initiator 38 may be a pyrotechnic cartridge similar to those used in firearms, or (as shown in the figures) may be a pyrotechnic charge commonly referred to as a squib. The initiator 38 is mounted in an appropriate hole 40 extending through the combustion chamber 14, preferably at the second longitudinal end 22. The initiator 38 may be provided with an appropriate mount 42 between the initiator 38 and hole 40, as shown.

As with the initiator 38, the heating material 36 may take any form known in the art. In this regard, it is noted that when referring to the heating material producing a quantity of heating gas, this is intended to include the heating material itself producing the heating gas by reaction, combustion, etc. However, it is also intended to encompass the heating material producing little or no gas itself, but heating a quantity of gas trapped within the combustion chamber 14. In either case, the heating material 36 produces a quantity of heating gas in the combustion chamber 14 according to the present invention.

Figure 2:
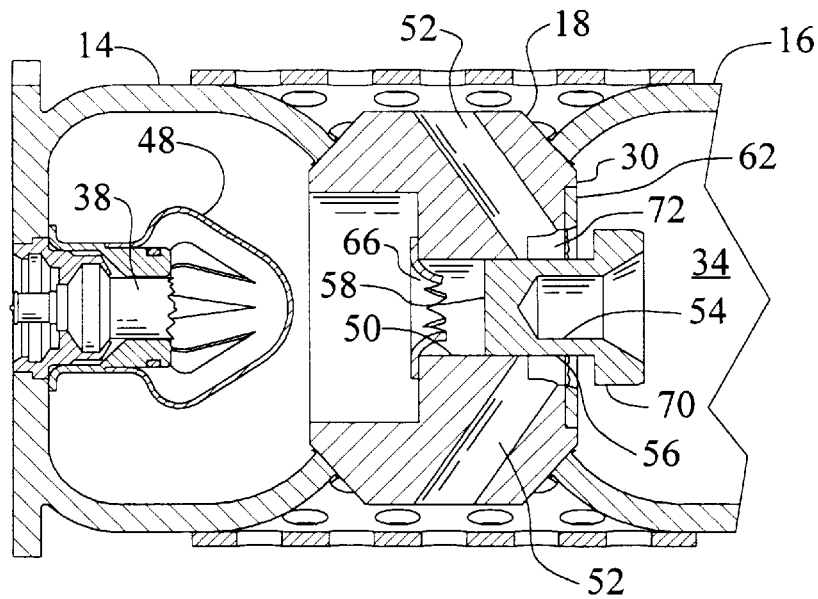
FIG. 2 is a detail side view, in partial cross-section, of the first embodiment during the initial stages of activation.
Figure 3:
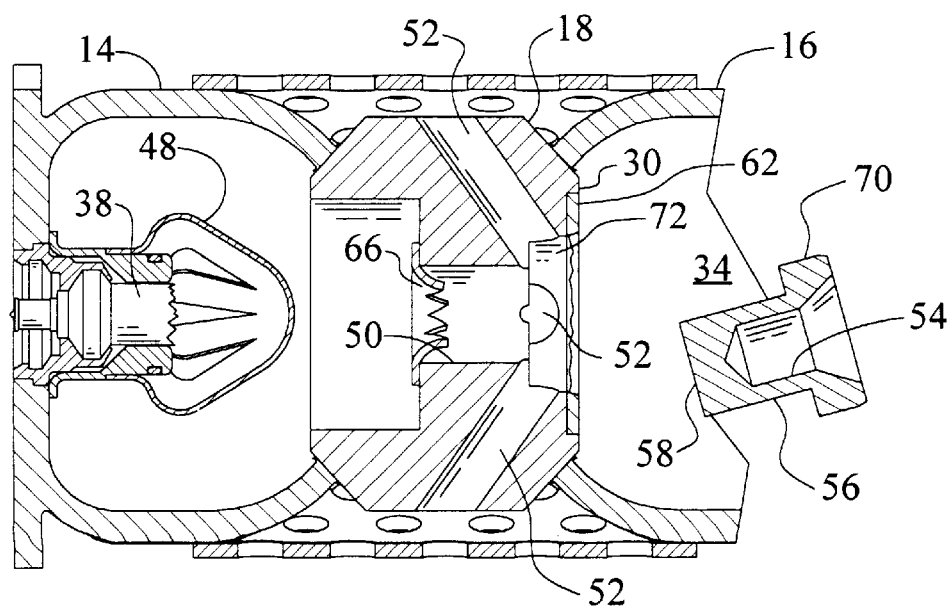
FIG. 3 is a detail side view, in partial cross-section, of the first embodiment during the latter stages of activation.

In the embodiment of FIGS. 1–3, the heating material 36 takes the form of a combination of a fluid fuel 44 and an oxidizer 46, as is known in the art. While these materials could be mixed within the combustion chamber 14, it is preferred that the fluid fuel 44 be held within a fuel dome 48 which covers the initiator 38. The oxidizer 46 is then held within the combustion chamber 14 outside of this fuel dome 48. As best illustrated in FIGS. 2 and 3, activation of the initiator 38 will produce a brief flash of heat and pressure which will cause the fuel dome 48 to rupture along predetermined weakened lines, permitting the fluid fuel 44 to mix with the oxidizer 46. The heat from activation of the initiator 38 also begins combustion (or reaction, or decomposition) of the mixture of the fluid fuel 44 and oxidizer 46, which produces a quantity of the heating gas at a very high temperature. This arrangement is similar to those known in the prior art, and any known materials may be used for the fluid fuel 44 and oxidizer 46.

To complete operation of the inflator 10, the stored gas 34 must exit, and the heating gas must mix with the stored gas 34. To this end, the bulkhead 18 is employed. In particular, the bulkhead 18 includes a flow passage 50 extending between the first chamber face 28 and second chamber face 30, and thus providing communication between the combustion chamber 14 and stored gas chamber 16. Additionally, the bulkhead 18 is provided with a plurality of exit ports 52, each of which extends from an interior end opening on the flow passage 50 to an exterior end opening on the sidewall 32 of bulkhead 18. The exit ports 52 thus provide communication between the stored gas chamber 16 and the exterior of the inflator 10, and therefore the cushion (not shown). While these elements provide the necessary communication, the inflator 10 still requires an arrangement to permit the gas to flow though the flow passage 50 and exit ports 52 only at the proper times. This is provided by a flow plug 54.

The flow plug 54 is initially located within the bulkhead 18, and in particular in the flow passage 50. The flow plug 54 includes a main body 56 defining longitudinal first and second end faces 58 and 60, respectively. The first end face 58 is adjacent to the combustion chamber 14, and the second end face 60 is adjacent to the stored gas chamber 16. The main body 56 has a size and shape which closely corresponds to the flow passage 50 to substantially, if not completely, block flow of the stored gas 34 through the flow passage 50. As made clear below, however, the flow plug 54 has a fit which permits it to be removed from the flow passage 50, and is not permanently fixed therein. Additionally, the flow plug 54 has a length, or is at least positioned within the flow passage 50, such that it additionally blocks the interior ends of the exit ports 52. The flow plug 54 therefore serves to initially block the flow of stored gas 34 from the inflator 10, the flow of stored gas 34 into the combustion chamber 14, and the flow of heating gas from the combustion chamber 14 into the stored gas chamber 16 or out of the inflator 10.

As noted above, the flow plug 54 is not permanently fixed within the flow passage 50. Rather, the flow plug 54 is sized, and the fit of the flow plug 54 within the flow passage 50 is arranged, such that upon production of the heating gas in the combustion chamber 14 the pressure within the combustion chamber 14 will rise and force the flow plug 54 from the flow passage 50 and into the stored gas chamber 16. This is illustrated by comparison of FIGS. 1–3. The initial condition, prior to activation, is shown in FIG. 1, and the flow plug 54 is in its initial position fully within the flow passage 50. After the initiator 38 has been activated and the heating material 36 is initially combusting (or reacting or decomposing), the pressure within the combustion chamber 14 has risen to the point where it forces the flow plug 54 to the right, as illustrated in FIG. 2. Finally, in the later stages of the activation, the pressure of the heating gas has forced the flow plug 54 fully from the flow passage 50, and into the stored gas chamber 16, as shown in FIG. 3. At this point the heating gas in the combustion chamber 14 is free to flow into the stored gas chamber 16 to mix with the stored gas 34, and this mixture of heating gas and stored gas 34 is also free to flow from the inflator 10 via the exit ports 52.

In practice, it is of course difficult to provide the flow plug 54 with a fit in the flow passage 50 which will both provide a gas-tight seal to prevent escape of the stored gas 34, and yet still permit movement of the flow plug 54 upon activation. To provide for both of these goals, it may be desirable to form the flow plug 54 with an enlarged sealing flange 62 extending outward from the main body 56 at second end face 60. This sealing flange 62 may then be welded to the second chamber face 30 to provide for a complete seal. This would, however, impede movement of the flow plug 54. To permit movement without degrading the seal, there may be provided a rupture groove 64 in the sealing flange 62, intermediate the weld and the main body 56. This rupture groove 64 would be designed to fail when the heating gas exerts the pressure against the flow plug 54, but would remain intact until that time.

A similar sealing problem may be present at the end of the flow plug 54 adjacent the combustion chamber 14. In particular, the combustion (or reaction or decomposition) of the heating material 36 may be enhanced by providing an initial period of high pressure. This pressure may be higher than that which will cause movement of the flow plug 54. To permit the pressure in the combustion chamber 14 to rise as desired (and also prevent any escape of the heating gas along the flow plug 54 and out the exit ports 52), a burst disc 66 may be provided on the first chamber face 28 overlying the flow plug 54. As is known in the art, burst discs are frangible elements which rupture when subjected to a predetermined pressure. As such, the burst disc 66 will initially seal the combustion chamber 14 until the predetermined pressure is reached. At that point, the burst disc 66 will rupture, and the heating gas will apply pressure to the flow plug 54 to begin its movement.

The above-described arrangement will provide an appropriate amount of gas to inflate a cushion in the desired short time period. Additionally, by providing the exit ports 52 in the bulkhead 18, which is located between the combustion chamber 14 and stored gas chamber 16, the output of the inflator 10 is centralized to reduce skewing the deployment of the cushion. This may be further enhanced by providing a diffuser 68 in the form of a perforated metal tube surrounding the bulkhead 18, and secured at its longitudinal ends to the combustion chamber 14 and stored gas chamber 16.

While the arrangement described above will inflate a cushion and has the advantage of reduced skewing, it does not provide for a soft onset of pressure in the cushion. Specifically, as the heating gas moves the flow plug 54 toward the stored gas chamber 16, the flow plug 54 will first uncover the exit ports 52, and will only then fully exit the flow passage 50. This permits the heating gas to exit the inflator 10 prior to the stored gas 34 exiting the inflator. This is the opposite of the delayed heating discussed above to provide for soft onset. Further, even after the flow plug 54 exits the flow passage 50, the flow of heating gas from the combustion chamber 14 will pass over the exit ports 52 before it reaches the stored gas chamber 16. A portion of the heating gas may thus flow directly out of the inflator, without mixing with the stored gas 34. Again, this is not conductive to soft onset. Increased mixing of the heating gas and stored gas 34 may be achieved however, by a further modification.

In particular, the flow plug 54 may be formed with a head flange 70 extending radially outward from the main body 56 at the second end face 60. The head flange 70 will be initially received within an appropriate depression 72 (FIGS. 2 and 3) formed in the second chamber face 30 of the bulkhead 18, with the flow passage 50 opening onto the depression 72. The head flange 70 is further located such that at least some of the interior ends of the exit ports 52 at least partially open onto the head flange 70 (i.e., at least partially open into the depression 72).

It is noted that the main body 56 and head flange 70 preferably have a circular cross-section, with the head flange 70 having a diameter larger than that of the main body 56. Other cross-sectional shapes are available, however, and the head flange 70 need not have the same cross-sectional shape as that of the main body 56. Further, while the head flange 70 extends radially outward from the main body 56, it need not be continuous about the periphery of the main body 56. Specifically, the head flange 70 may be formed of a plurality of protrusions, with the protrusions being aligned with at least some of the interior ends of the exit ports 52.

As a final note, the longitudinal length of the head flange 70 is designed such that, during the movement of the flow plug 54 out of the flow passage 50, the head flange 70 will exit the depression 72 before the first end face 58 of the main body 56 exits from the flow passage 50. This is best illustrated in FIG. 2. In this manner, those exit ports 52 which were initially covered by the head flange 70 are first opened to the stored gas chamber 16 prior to the heating gas exiting the combustion chamber 14, since the main body 56 is still blocking the flow passage 50 at this time. As such, the stored gas 34 may begin to exit the inflator 10 through the exit ports 52 before the heating gas begins mixing with the stored gas 34 and increasing its pressure. This provides the desired time delay between release of the stored gas 34 and its heating which produces the soft onset of pressure within the cushion which is most desired.

The subsequent operation of the inflator 10 is similar to that previously described, with the pressure from the heating gas in the combustion chamber 14 forcing the flow plug 54 completely from the flow passage 50. At this point the heating gas begins to flow through the flow passage 50 to mix with the stored gas 34, increasing its temperature, and therefore its pressure. As noted above, however, for this arrangement using the head flange 70, the heating is delayed, providing the softer onset of pressure.

Figure 4:
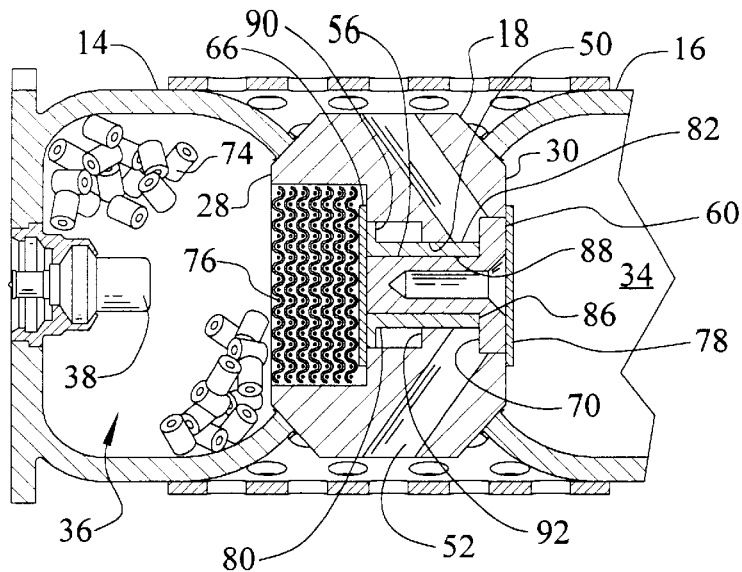
FIGS. 4–6 are detail side views, in partial cross-section, of a second embodiment of the present invention prior to activation, during the initial stages of activation, and during the latter stages of activation, respectively.
Figure 5:
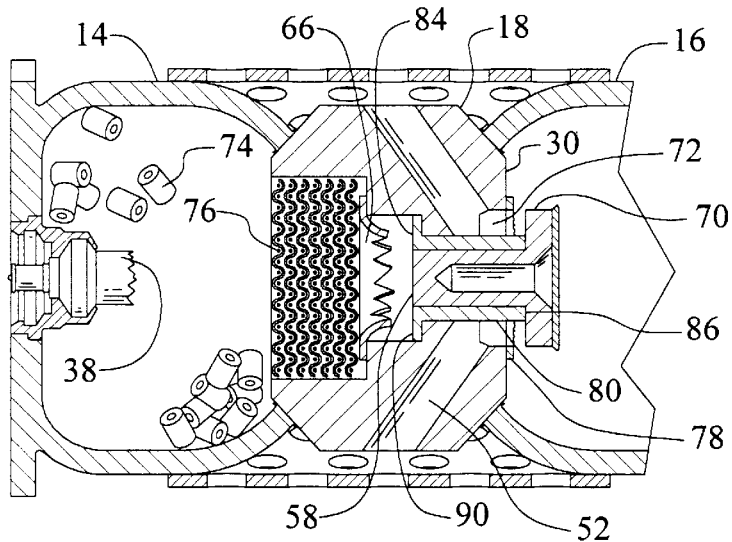
Figure 6:
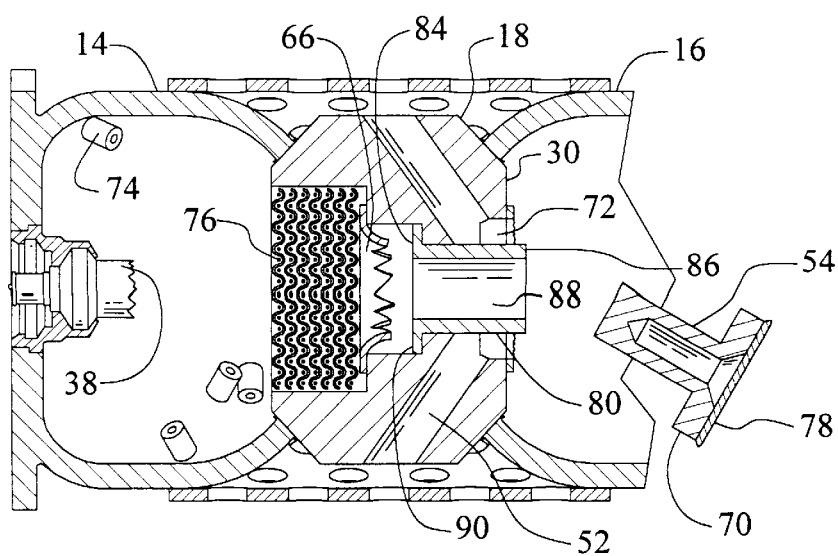

While the use of the head flange 70 provides the desired inflation characteristic of softer onset compared to a flow plug 54 having no head flange 70, the onset of pressure may still be faster than desired for some applications. This is believed to be due to the placement of the interior ends of the exit ports 52 within the depression 72, adjacent the flow passage 50. As may be envisioned, the heating gas flowing through the flow passage 50 may flow out the exit ports 52 with little mixing of the stored gas 34. To provide increased mixing of the heating gas with the stored gas 34 prior to exit from the inflator 10, a further embodiment of the present invention is shown in FIGS. 4–6.

This embodiment is very similar to that shown in FIGS. 1–3, with like elements having like reference numbers, and with the majority of the stored gas chamber 16 being identical. Two minor variations are also shown in this embodiment. First, the heating material 36 of this embodiment is shown as pellets of a pyrotechnic material 74. The pyrotechnic material 74 may be of any formulation commonly employed in the art, and is shown primarily to emphasize the wide variety of materials which may be used for the heating material 36. For use with such a pyrotechnic material 74, a filter 76 is also provided in a cavity in the first chamber face 28 of bulkhead 18, in order to filter out particulate material, and possibly to act as a heat sink.

The second minor variation of this embodiment is the replacement of the sealing flange 62 with a separate burst disc 78 overlying the second end face 60 of the flow plug 54. The burst disc 78 may be secured to the second chamber face 30 (and preferably also the second end face 60), such as by welding. As may be envisioned, the burst disc 78 will serve to seal the stored gas chamber 16 prior to activation, but will rupture under the pressure of the flow plug 54 movement during activation. With these minor variations discussed, the further variation in this embodiment will now be described.

While this embodiment retains the use of the flow passage 50 and flow plug 54, it further includes the use of a slide nozzle 80. The slide nozzle 80 includes a main shaft 82 elongated between longitudinal first and second ends 84 (FIG. 5) and 86, respectively, with the first end 84 being located closest to the combustion chamber 14. The slide nozzle 80 also includes a central cavity 88 extending therethrough. The outer peripheral face of the main shaft 82 is sized and shaped to be received within the flow passage 50 in a manner similar to the main body 56 in the first embodiment, and as such movement of the main shaft 82 along the flow passage 50 is permitted. Additionally, the central cavity 88 is sized and shaped to similarly receive the main body 56 of the flow plug 54. The main shaft 82 preferably has a length sufficient to extend between the burst disc 66 and the head flange 70 (or the sealing flange 62/burst disc 78, if the head flange 70 is not employed) to prevent unintended movement of the slide nozzle 80 and attendant noise.

The slide nozzle 80 also includes an abutment flange 90 extending radially outward from the main shaft 82 at the first end 84. Further, the first chamber face 28 of the bulkhead 18 includes a slide cavity formed therein which receives the abutment flange 90, and which defines an abutment wall 92 in opposed relation to the abutment flange 90. As illustrated by comparison of FIGS. 4 and 5, the presence of the abutment flange 90 and abutment wall 92 permit the slide nozzle 80 to move from an initial position with the abutment flange 90 spaced from the abutment wall 92 (shown in FIG. 4), to a final position with the abutment flange 90 contacting the abutment wall 92 (shown in FIG. 5). The thickness of the abutment flange 90, depth of the slide cavity, and length of the main shaft 82 are all predetermined such that, in the final position of the slide nozzle 80, the second end 86 of the main shaft 82 extends beyond the interior ends of the exit ports 52, in the direction of the stored gas chamber 16. It is more preferred that the second end 86 would be at least aligned with the second chamber face 30 of the bulkhead 18, and most preferred that the second end 86 would extend beyond the second chamber face 30 to be located within the stored gas chamber 16, as shown.

The operation of this embodiment is similar to the previous embodiments. The initial condition just prior to activation of the inflator 10 is shown in FIG. 4. The burst discs 66 and 78 are intact, and thus serve to seal the combustion chamber 14 and stored gas chamber 16. The slide nozzle 80 is in its initial position, as is the flow plug 54. Upon activation, the initiator 38 will ignite the heating material 36 to begin creation of the heating gas, greatly increasing the pressure within the combustion chamber 14. This pressure will eventually rupture the burst disc 66 (if employed), and this pressure will then act upon the abutment flange 90 of the slide nozzle 80, and upon the first end face 58 of the flow plug 54. This pressure will serve to move both the slide nozzle 80 and the flow plug 54 away from the combustion chamber 14, and towards the stored gas chamber 16.

In a manner similar to the first embodiment, this movement will rupture the burst disc 78 (if employed). Continued movement of the slide nozzle 80 and flow plug 54 toward the stored gas chamber 16 will cause the head flange 70 to clear the depression 72, permitting the stored gas 34 to begin exiting the inflator 10 via the exit ports 52. At this time the flow plug 54 is still retained within the central cavity 88 of slide nozzle 80, and as such the heating gas has not yet begun to mix with the stored gas 34. This is illustrated in FIG. 5. It is noted that this initial release of the stored gas 34 is effected only if the head flange 70 is employed, which is not required.

The movement of the slide nozzle 80 toward the stored gas chamber 16 will eventually be arrested by the abutment flange 90 coming into contact with the abutment wall 92. This halting of the slide nozzle 80 in its final position will, as noted above, result in the second end 86 of the slide nozzle 80 extending past the interior ends of the exit ports 52, as shown. While the slide nozzle 80 has come to rest at this point, the pressure of the heating gas continues to force the flow plug 54 through the central cavity 88 towards the stored gas chamber 16.

In a manner similar to the previous embodiments, the continued movement of the flow plug 54 will eventually cause it to be forced from the central cavity 88 and into the stored gas chamber 16. This will open the central cavity 88, permitting the heating gas to flow into the stored gas chamber 16 to mix with the stored gas 34. This is illustrated in FIG. 6. As noted above, however, the placement of the second end 86 at a position beyond the interior ends of the exit ports 52 reduces or eliminates the flow of the heating gas directly into the exit ports 52. Instead, the heating gas will flow into the stored gas chamber 16 to mix with the stored gas 34 before this mixture then flows through the exit ports 52. This results in a further delay in heated inflation gas reaching the cushion compared to previous embodiments, thus providing even softer onset of pressure in the cushion.

While the embodiments described above are suitable, other variations are of course available. For example, the abutment flange 90 may come into contact with the abutment wall 92 prior to the head flange 70 clearing the depression 72. As a further example, the slide nozzle 80 need not move, but may be fixed in the final position at all times. With this variation the initial position of the flow plug 54 would be as shown in FIG. 5. To seal the stored gas 34 in the stored gas chamber 16, this variation would further require a skirt to be formed on the peripheral edge of head flange 70, with the skirt extending towards the combustion chamber 14 and into the depression 72, in surrounding relation to the second end 86 of slide nozzle 80. Other variations will be apparent to those skilled in the art.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. An airbag inflator, comprising:
   a combustion chamber containing a quantity of heating material and an initiator for activating said heating material to create a heating gas;
   a stored gas chamber containing a quantity of stored gas;
   a bulkhead separating said combustion chamber and said stored gas chamber, said bulkhead including a flow passage extending therethrough and providing communication between said combustion chamber and said stored gas chamber, said bulkhead further including at least one exit port extending between an exterior end communicating with atmosphere and an interior end opening onto said flow passage;
   a flow plug mounted within said flow passage and initially blocking flow through said flow passage and said interior end of said exit port, said flow plug being mounted for movement through, and out of, said flow passage and into said stored gas chamber due to an increase in pressure within said combustion chamber caused by activation of said heating material, said movement of said flow plug opening said flow passage to permit said heating gas to flow into said stored gas chamber and mix with said stored gas, and said movement further opening said exit port to permit said heating gas and said stored gas to exit said inflator.

2. An inflator as in claim 1, wherein said bulkhead includes a first chamber face adjacent said combustion chamber and a second chamber face adjacent said stored gas chamber, said flow passage opening onto said first and second chamber faces, and further including a burst disc mounted to each of said first and second chamber faces in covering, sealing, relation to said flow passage.

3. An inflator as in claim 1, wherein said bulkhead includes a first chamber face adjacent said combustion chamber and a second chamber face adjacent said stored gas chamber, said flow passage opening onto said first and second chamber faces, and further including a burst disc mounted to said first chamber face in covering, sealing, relation to said flow passage, and wherein said flow plug further includes an end face adjacent said stored gas chamber and a sealing flange extending radially outward from said end face and sealed to said second chamber face.

4. An inflator as in claim 1, wherein said at least one exit port comprises a plurality of said exit ports, each having said interior end opening onto said flow passage.

5. An inflator as in claim 4, wherein said bulkhead includes a first chamber face adjacent said combustion chamber and a second chamber face adjacent said stored gas chamber, and a depression extending into said second chamber face, said flow passage opening onto said depression, and at least certain ones of said interior ends of said exit ports at least partially opening onto said depression, and wherein said flow plug includes a main body received in said flow passage and a head flange extending radially outward from said end face and initially received within said depression to block said at least portions of said interior ends of said certain ones of said exit ports, said main body and said head flange being constructed and arranged such that during said movement of said flow plug, said head flange exits said depression prior to said main body exiting said flow passage, such that said stored gas is at least partially released from said inflator prior to said mixing with said heating gas.

6. An inflator as in claim 5, wherein said flow passage opens onto said first and second chamber faces, and further including a burst disc mounted to each of said first and second chamber faces in covering, sealing, relation to said flow passage.

7. An inflator as in claim 5, wherein said flow passage opens onto said first and second chamber faces, and further including a burst disc mounted to said first chamber face in covering, sealing, relation to said flow passage, and wherein said flow plug further includes an end face adjacent said stored gas chamber and a sealing flange extending radially outward from said end face and sealed to said second chamber face.

8. An inflator as in claim 5, wherein all of said interior ends of said exit ports at least partially open onto said depression.

9. An inflator as in claim 8, wherein said flow passage opens onto said first and second chamber faces, and further including a burst disc mounted to each of said first and second chamber faces in covering, sealing, relation to said flow passage.

10. An inflator as in claim 8, wherein said flow passage opens onto said first and second chamber faces, and further including a burst disc mounted to said first chamber face in covering, sealing, relation to said flow passage, and wherein said flow plug further includes an end face adjacent said stored gas chamber and a sealing flange extending radially outward from said end face and sealed to said second chamber face.

11. An inflator as in claim 8, further including a slide nozzle having a main shaft including a first end adjacent said combustion chamber, a second end adjacent said stored gas chamber and a central cavity extending between said first and second ends, said main shaft being received within said flow passage with said second end extending beyond said interior ends of said exit ports in the direction of said stored gas chamber, and said flow plug being received within said central cavity for said movement, such that said flow plug will exit said central cavity to permit flow of said heating gas to said stored gas chamber.

12. An inflator as in claim 11, wherein said flow passage opens onto said first and second chamber faces, and further including a burst disc mounted to each of said first and second chamber faces in covering, sealing, relation to said flow passage.

13. An inflator as in claim 11, wherein said flow passage opens onto said first and second chamber faces, and further including a burst disc mounted to said first chamber face in covering, sealing, relation to said flow passage, and wherein said flow plug further includes an end face adjacent said stored gas chamber and a sealing flange extending radially outward from said end face and sealed to said second chamber face.

14. An inflator as in claim 11, wherein said first chamber face includes a slide cavity having an abutment wall opposed to said combustion chamber, and wherein said slide nozzle includes an abutment flange extending radially outward from said first end of said main shaft, and wherein said slide nozzle is mounted within said flow passage for sliding movement between an initial position with said abutment flange spaced from said abutment wall and a final position with said abutment flange contacting said abutment wall, said movement being effected by said increase in pressure within said combustion chamber caused by activation of said heating material.

15. An inflator as in claim 14, wherein said flow passage opens onto said first and second chamber faces, and further including a burst disc mounted to each of said first and second chamber faces in covering, sealing, relation to said flow passage.

16. An inflator as in claim 14, wherein said second end of said main shaft of said slide nozzle extends beyond said second chamber face into said stored gas chamber when said slide nozzle is in said final position.

* * * * *